(12) United States Patent
Horst et al.

(10) Patent No.: US 7,474,825 B1
(45) Date of Patent: Jan. 6, 2009

(54) CIRCULAR GRATING RESONATOR WITH INTEGRATED ELECTRO-OPTICAL MODULATION

(75) Inventors: Folkert Horst, Zurich (CH); Nikolaj Moll, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/146,601

(22) Filed: Jun. 26, 2008

Related U.S. Application Data

(63) Continuation of application No. 12/041,265, filed on Mar. 3, 2008, now Pat. No. 7,406,226.

(51) Int. Cl.
*G02B 6/26* (2006.01)
*H01S 3/08* (2006.01)

(52) U.S. Cl. .................. 385/37; 385/2; 385/8; 385/40; 385/131; 372/94

(58) Field of Classification Search .............. 385/2, 385/8, 37, 50, 131, 32, 39, 40; 372/94, 102
See application file for complete search history.

(56) References Cited

U.S. PATENT DOCUMENTS

| 5,561,683 | A | * | 10/1996 | Kwon ........................ 372/96 |
| 7,120,338 | B2 | | 10/2006 | Gunn, III |
| 2007/0019905 | A1 | | 1/2007 | Mahrt et al. |
| 2007/0201796 | A1 | | 8/2007 | Guide |

* cited by examiner

*Primary Examiner*—Hemang Sanghavi
(74) *Attorney, Agent, or Firm*—Cantor Colburn LLP; Martin Toleti

(57) ABSTRACT

A method of forming an optical structure includes forming a circular grating resonator (CGR) on a substrate, the CGR including a center disc and a plurality of concentric rings spaced from one another; forming an input planar waveguide and an output planar waveguide on the substrate, the input planar waveguide and the output planar waveguide optically coupled to the CGR; and forming an electrode pair on the substrate, coplanar with the input and output planar waveguides, the electrode pair comprising an electrically conductive material in contact with opposing ends of the center disc of the CGR so as to render the CGR capable of electro-optical control.

5 Claims, 4 Drawing Sheets

CIRCULAR GRATING RESONATOR WITH INTEGRATED ELECTRO-OPTICAL MODULATION

CROSS-REFERENCE TO RELATED APPLICATION

This application is a continuation of U.S. Patent Application Serial No. 12/041,265, filed Mar. 3, 2008, the disclosure of which is incorporated by reference herein in its entirety.

BACKGROUND

The present invention relates generally to optical switching devices and, more particularly, to a circular grating resonator structure with integrated electro-optical modulation.

Multi-core microprocessor architectures have been developed in order to mitigate increased power dissipation in high-performance computer chips. However, the bandwidth limitations for global electrical interconnections between various cores are rapidly becoming the major factor in restricting further scaling of total chip performance. One approach resolving this interconnect bottleneck is to transmit and route signals in the optical domain, since optical signals can provide both immense aggregate bandwidth and large savings in on-chip dissipated power.

Many existing types of optical switches fall under the category of microelectromechanical (MEMS) devices, in which tiny components such as prisms or mirrors are positionally adjusted in order to redirect input optical signals. However, such MEMS devices are not suited for multi-core chip scaling purposes. On the other hand, the field of integrated optics has expanded tremendously in recent years, and integrated optical device solutions are now being proposed for applications in a variety of fields including, for example, telecommunications, data communications, high performance computing, biological and chemical sensing, and radio frequency (RF) networks.

In this regard, an optical waveguide or combination of optical waveguides may be formed on an integrated circuit (IC) to form devices such as optical resonators, arrayed waveguide gratings, couplers, splitters, polarization splitters/combiners, polarization rotators, Mach-Zehnder (MZ) interferometers, multimode interference waveguides, gratings, mode transformers, delay lines, and optical vias. Such on-chip devices may in turn be used to create an integrated optical circuit or planar lightwave circuit that performs one or more optical functions such as, for example: multiplexing/demultiplexing, optical add/drop, variable attenuation, switching, splitting/combining, filtering, spectral analysis, variable optical delay, clock distribution, amplitude/phase modulation, polarization rotation, comb generation, and dispersion compensation.

Circular grating resonators (CGRs), also known as Annular Bragg reflectors or "fingerprint" structures have more recently been considered for applications in integrated optics such as lasing and all-optical switching. In particular, CGRs have a very small footprint of a few micrometers, which essentially corresponds to the smallest optical resonators possible. Thus, even at relatively low refractive index contrasts, CGRs offer full two-dimensional light confinement, making circular grating resonators a very attractive candidate for future integrated photonic devices since they may be fabricated of any transparent (low absorption) material.

With respect to electro-optical devices in which the resonance of the optical modulator is adjusted by an electrical control signal, there must be a technical means of applying an electric field in the region of the resonator. The electric field changes the index of refraction of the resonator and hence its resonance frequency. In so doing, an input optical signal to the resonator may be switched on and off. However, the incorporation of electrodes into a photonic structure such as a CGR is a significant challenge, since electrically conducting materials absorb light and thus lead to high losses.

SUMMARY

In an exemplary embodiment, a method of forming an optical structure includes forming a circular grating resonator (CGR) on a substrate, the CGR including a center disc and a plurality of concentric rings spaced from one another; forming an input planar waveguide and an output planar waveguide on the substrate, the input planar waveguide and the output planar waveguide optically coupled to the CGR; and forming an electrode pair on the substrate, coplanar with the input and output planar waveguides, the electrode pair comprising an electrically conductive material in contact with opposing ends of the center disc of the CGR so as to render the CGR capable of electro-optical control.

BRIEF DESCRIPTION OF THE DRAWINGS

Referring to the exemplary drawings wherein like elements are numbered alike in the several FIGURES.

DETAILED DESCRIPTION

Disclosed herein is a method of forming circular grating resonator (CGR) structure with integrated electro-optical modulation. As indicated above, the incorporation of electrodes into a photonic structure such as a CGR is a significant challenge, since electrically conducting materials absorb light and lead to high losses. Although electrodes may be located both above and beneath the resonator (i.e., out-of-plane), such an arrangement still leads to decreased performance of the resonator. Moreover, such an out-of-plane arrangement increases the complexity of the structure, as well as increases the fabrication difficulty. Accordingly, the embodiments herein introduce a CGR based electro-optical modulator based featuring in-plane electrodes. The electrodes are located at one or more nodal planes of the electric field of the particular operating resonance mode, thereby minimizing the absorption due to the electrodes.

In addition to minimizing losses of the operating resonance mode, the electrodes will suppress all resonance modes that do not exhibit a nodal plane at the location of the electrodes. Optionally, the CGR may also be formed with additional trenches in the circular gratings in order to suppress further unwanted resonances.

Figure 1:
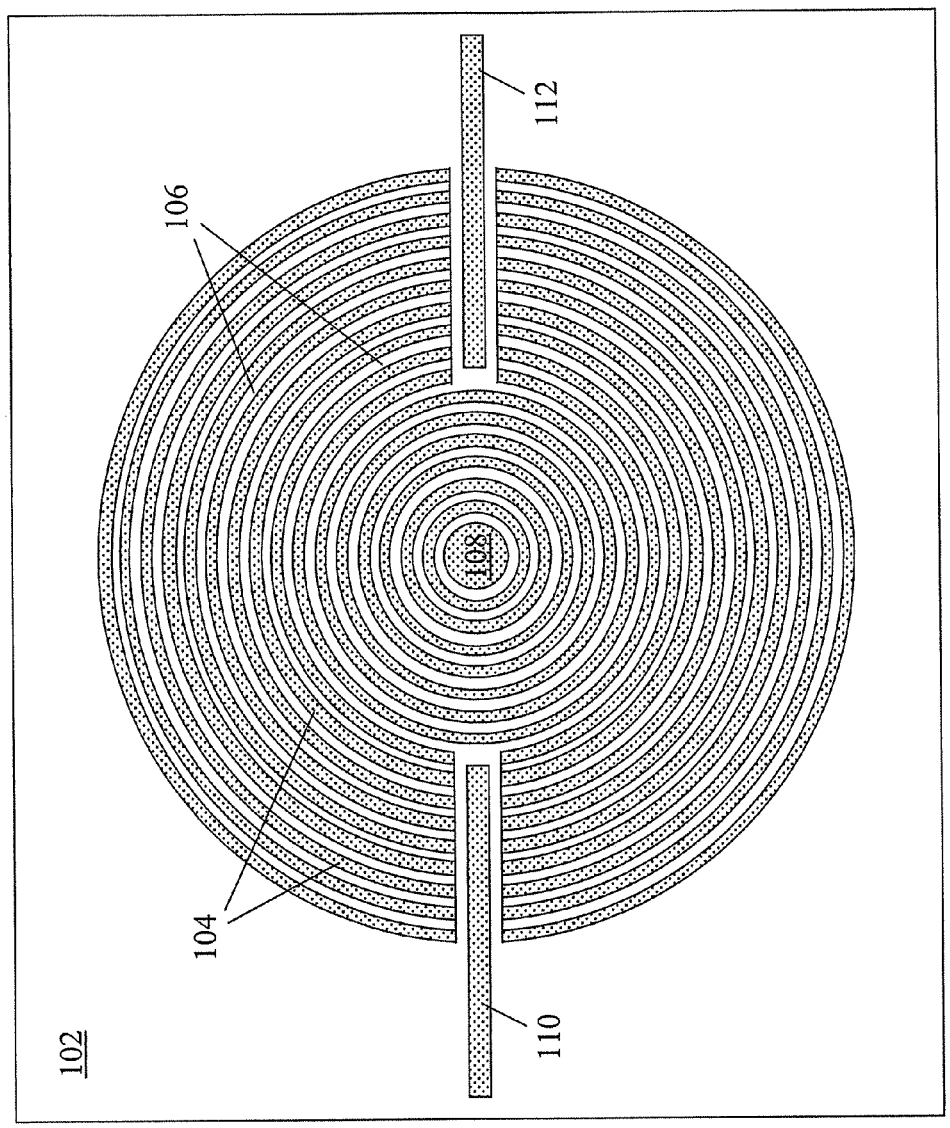
FIG. 1 is a top view of an existing two-port CGR structure.

Referring initially to FIG. 1, there is shown a top view of an existing CGR structure 100. The structure 100 includes a semiconductor substrate 102, such as silicon dioxide ($SiO_2$), for example. A plurality of concentric rings 104 is formed upon the substrate 102, the concentric rings 104 serving as Bragg mirrors and comprising a high index of refraction material such as silicon (Si), or gallium arsenide (GaAs), for example. Each ring 104 is spaced from one another by a region 106 of lower index material, such as air. Alternatively, the rings may be encapsulated in a cladding material such as SiO2. For purposes of illustration, the rings 104 in FIG. 1 are shown spaced by air. At the center of the structure 100, there is located a center disc 108 (e.g., Si).

In addition to the center disc 108 and concentric ring 104 structures, the structure 100 of FIG. 1 is a two-port device, in that it also includes an input planar waveguide 110 and an output planar waveguide 112 also formed on the substrate 102. Light arriving from an inward traveling mode of the input planar waveguide 110 optically couples to a grating resonator mode of the CGR, which in turn optically couples to an outward traveling mode of the output planar waveguide 112. Depending upon the wavelength of light introduced into the CGR structure 100 and the resonance of the resonator mode of the structure, light transmission from the input planar waveguide 110 to the second output planar waveguide 112 may be achieved. The two-port structure 100 can thus serve as an electro-optical modular or a spectral filter, for example.

One way to control the refractive index of the center disc 108 (and thus adjust the resonance frequency of the structure 100) is to couple an optical control signal to the center disc 108 though a separate waveguide path (not shown in FIG. 1) formed in the structure 100. Additional information regarding all-optical switching with circular grating resonators may be found in U.S. Patent Application Publication 2007/0019905 of Mahrt, et al., the contents of which are incorporated herein by reference in their entirety. However, for resonators where an electrical control signal is desired, there is still the issue of how to couple electrically conductive materials to the center disc 108 in a manner that does not substantially degrade the performance of a CGR, such as the one shown in FIG. 1.

Figure 2:
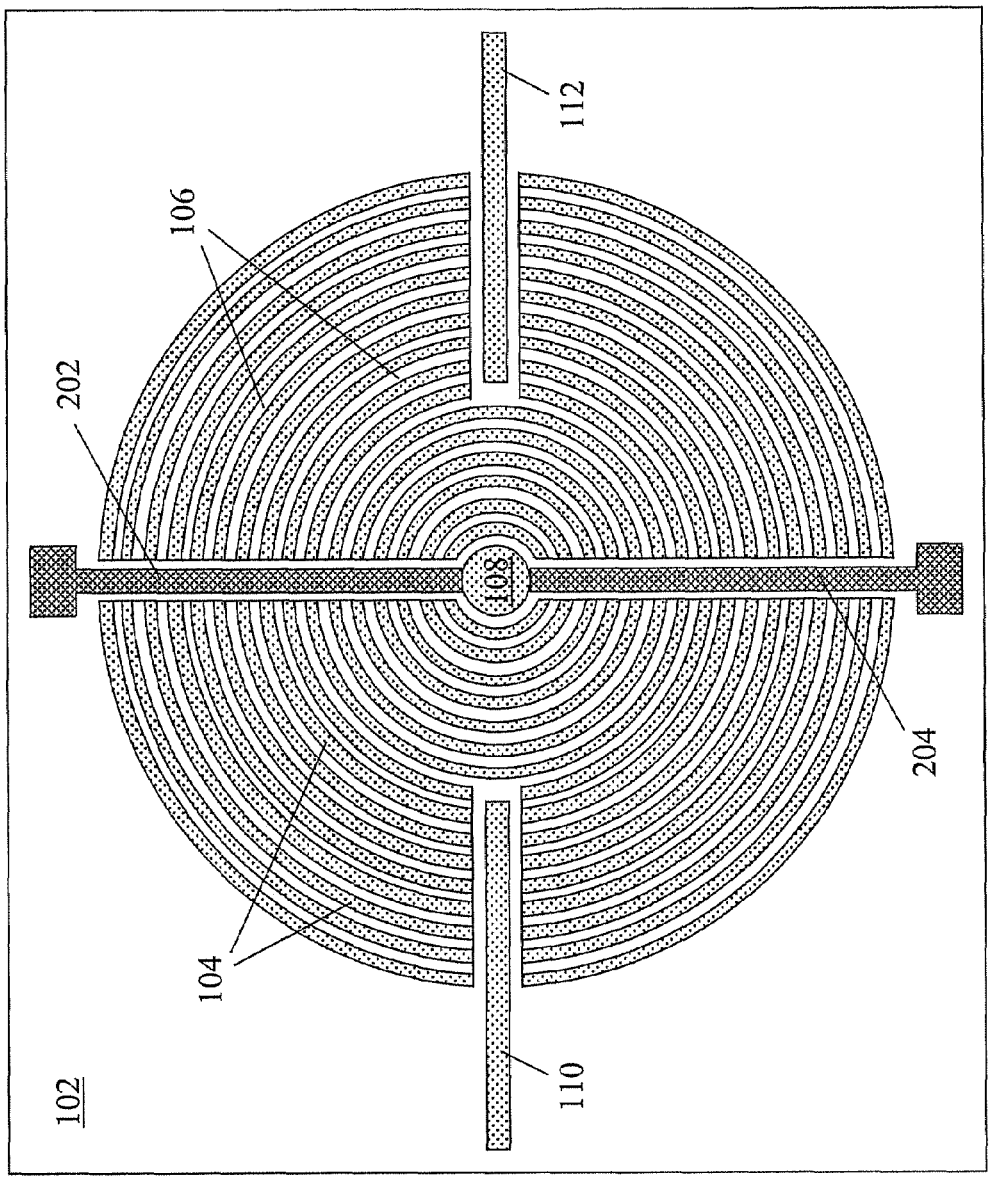
FIG. 2 is a top view of CGR structure with integrated electro-optical modulation, in accordance with an embodiment of the invention.

FIG. 2 is a top view of CGR structure 200 with integrated electro-optical modulation, in accordance with an embodiment of the invention. As is shown, a pair of in-plane electrodes 202, 204 is formed on the substrate 102 so as to contact opposing sides of the center disc 108. As is the case with the planar waveguides 110, 112, trenches 206 are defined within the concentric ring pattern to accommodate the formation of the electrically conductive material of the electrodes 202, 204. Although a longitudinal axis of the electrode pair 202, 204 is shown as substantially perpendicular to a longitudinal axis of the input/output planar waveguide pair 110, 112 in the exemplary embodiment, this is actually dependent upon the location of the electric fields of the nodal planes corresponding to the resonances of the selected operating mode(s) of the resonator. That is, the location of the coplanar electrodes 202, 204 formed on the substrate is selected so as to correspond to a region of minimum electric field intensity in the CGR, which in turn depends upon the resonance mode of the device.

Figure 3:
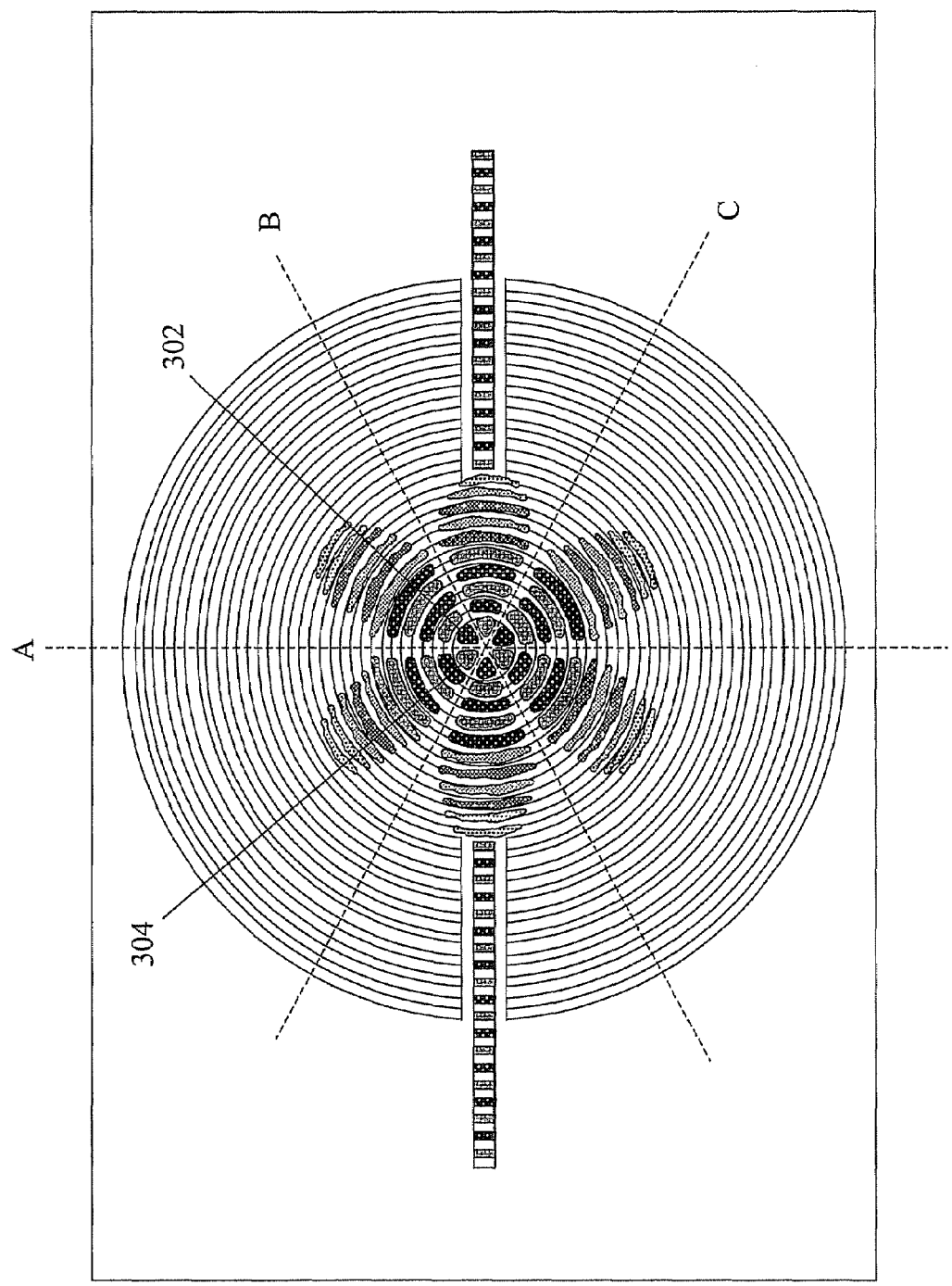
FIG. 3 illustrates the electric field intensity of a CGR in resonance at an operating mode of m=3.

The choice of electrode location for a given resonance mode may be illustrated with reference to FIG. 3. In this example, FIG. 3 illustrates the electric field intensity of a CGR in resonance at an odd angular momentum node (e.g., a mode of m=3). Regions 302 correspond to electric field locations of one polarity, while regions 304 correspond to electric field locations of the opposite polarity. As can be seen, the intensity of the electric field diminishes within the CGR in a radially outward direction. As is also shown, nodal planes (boundaries) for this mode of resonance are defined along the axes labeled A, B and C in FIG. 3, along which there is substantially no electric field intensity. For this example, the nodal planes are disposed about 60 degrees apart from one another, with axis A being substantially perpendicular to the longitudinal axis of the input/output planar waveguide pair, within the plane of the substrate.

Accordingly, referring back to FIG. 2, for the CGR structure 200, which is operated at a mode such that there is a nodal plane perpendicular to the waveguides, the electrode pair 202, 204 is formed at this axis (i.e., axis A in FIG. 3). This ensures that these "in-plane" electrical contacts do not degrade the performance of the CGR-based electro-optical modulator, since the electric field in this region is minimal and thus the placing of electrodes in this region does not lead to any additional optical absorption. Furthermore, it will be appreciated that other resonance modes that do not exhibit a nodal plane in the region of the electrodes (i.e., that have electric field intensity at an orthogonal axis to the input/output planar waveguide pair) will experience additional absorption losses, thus effectively suppressing such resonance modes.

It will further be appreciated from FIG. 2 that, for the exemplary resonance mode m=3, the electrode pair 202, 204 could also be located at either of the other two nodal planes (i.e., along axis B or along axis C), which are at an angle of about 30 degrees with respect to the longitudinal axis of the input/output planar waveguide pair.

Figure 4:
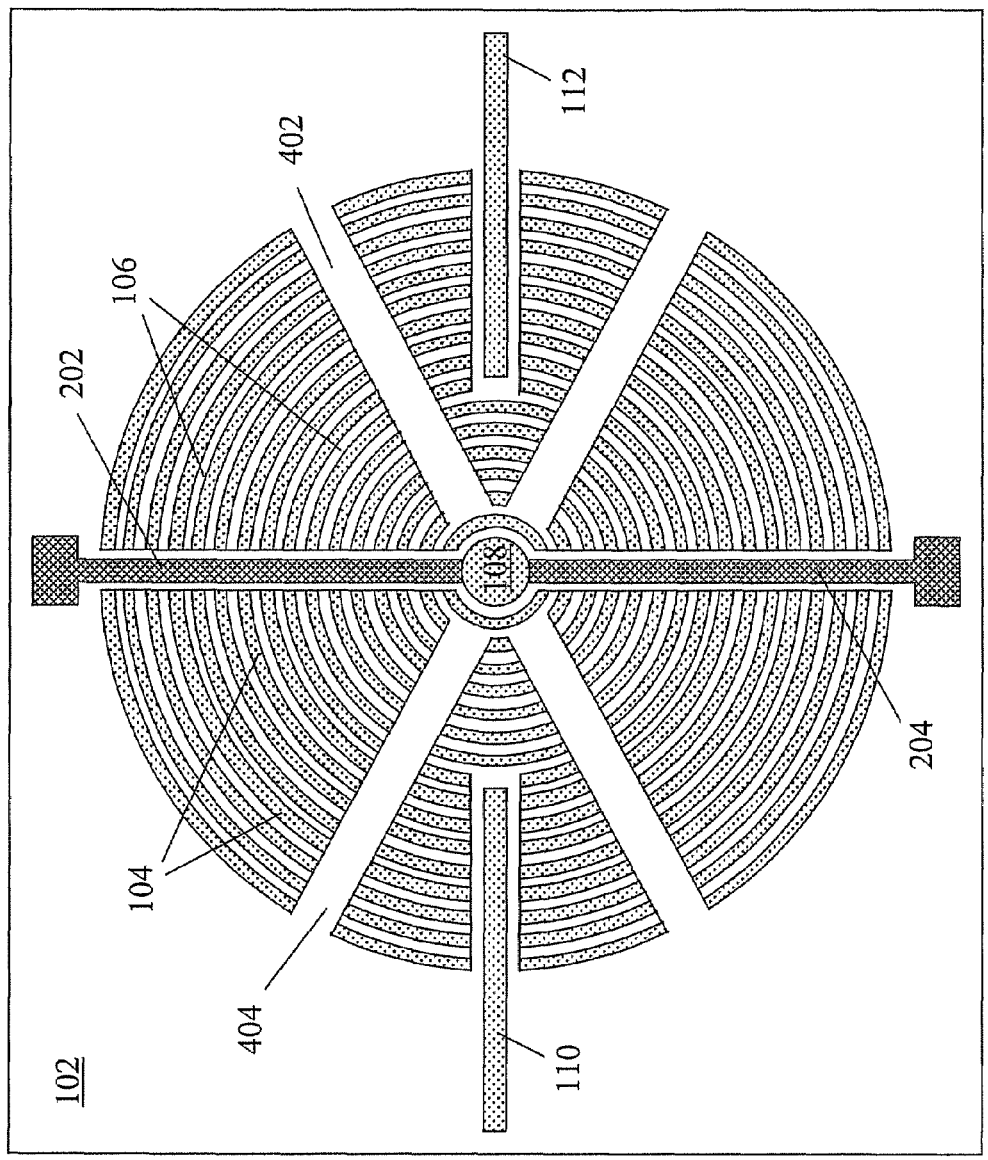
FIG. 4 is a top view of a CGR structure with integrated electro-optical modulation, in accordance with an alternative embodiment of the invention.

Regardless of the specific location of the electrode pair, for the example of FIG. 3, it is also possible to implement additional resonance suppression capability by introducing losses for other resonance modes not having nodal planes at the same locations as the desired operational mode. More specifically, trenches may be defined along one or more axes corresponding to the nodal planes. For example, FIG. 4 is a top view of a CGR structure 400 with integrated electro-optical modulation, in accordance with an alternative embodiment of the invention. In addition to the electrode pair 202, 204, located a nodal plane corresponding to axis A in FIG. 3, the structure 400 of FIG. 4 further includes additional trenches 402, 404, located at the other nodal planes corresponding to axis B and axis C in FIG. 3.

As is the case with the electrode pair 202, 204, the trenches 402, 404, not only do not interfere with the optical performance of the CGR, but also suppress any resonance modes that do not have nodal planes at the trench locations. That is, trenches 402, 404 also induce additional losses for other modes not corresponding to the m=3 case.

As will thus be appreciated, the embodiments described herein present a means to implement an in-plane electrical control connection for a CGR formed on a substrate. The electrode contacts are coplanar with respect to input and output coupling waveguides and are separated by trenches for isolation purposes. The angle at which the electrode contacts are disposed is dependent upon a desired operational mode, wherein the electrodes are located at nodal planes (i.e., regions of substantially no electric field intensity when the CGR is in resonance). This structural configuration is also easier to fabricate since no additional structures above or below the circular grating resonator are necessary. Furthermore, the in-plane electro-optical modulator also obviates the need for cladding.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming an optical structure, the method comprising:
    forming a circular grating resonator (CGR) on a substrate, the CGR comprising a center disc and a plurality of concentric rings spaced from one another;
    forming an input planar waveguide and an output planar waveguide on the substrate, the input planar waveguide and the output planar waveguide optically coupled to the CGR; and
    forming an electrode pair on the substrate, coplanar with the input and output planar waveguides, the electrode pair comprising an electrically conductive material in contact with opposing ends of the center disc of the CGR so as to render the CGR capable of electro-optical control.

2. The method of claim 1, wherein the location of the electrode pair on the substrate corresponds to a nodal plane based on a selected resonance mode of operation for the CGR, with the nodal plane corresponding to at least one region of substantially no electric field intensity whenever the CGR is in resonance.

3. The method of claim 2, wherein a longitudinal axis of the electrode pair is substantially orthogonal to a longitudinal axis of the input and output planar waveguides.

4. The method of claim 2, further comprising:
    defining one or more trenches defined the plurality of concentric rings of the CGR;
    wherein locations of the one or more trenches correspond to additional nodal planes based on the selected resonance mode of operation for the CGR.

5. The method of claim 4, further comprising defining a trench within the plurality of concentric rings for each nodal plane based on the selected resonance mode of operation for the CGR.

* * * * *